United States Patent [19]

Link et al.

[11] Patent Number: 4,606,683

[45] Date of Patent: Aug. 19, 1986

[54] METHOD AND DEVICE FOR PRODUCING THREAD

[75] Inventors: Helmut F. Link, Aichwald; Günther Trautmann, Kirchheim-Nabern, both of Fed. Rep. of Germany

[73] Assignee: Index-Werke Komm. -Ges. Hahn & Tessky, Esslingen, Fed. Rep. of Germany

[21] Appl. No.: 693,922

[22] Filed: Jan. 23, 1985

[30] Foreign Application Priority Data

Jan. 27, 1984 [DE] Fed. Rep. of Germany ....... 3402743

[51] Int. Cl.$^4$ ............................................. B23G 1/34
[52] U.S. Cl. ......................................... 409/66; 409/74
[58] Field of Search ................... 409/66, 74, 76, 144; 408/1, 3, 154

[56] References Cited

U.S. PATENT DOCUMENTS

| | | | |
|---|---|---|---|
| 1,442,483 | 1/1923 | Lee | 409/76 X |
| 1,507,235 | 9/1924 | Hall | 409/66 |
| 1,613,577 | 1/1927 | Fletcher | 409/76 |
| 3,851,564 | 12/1974 | Kitano | 409/74 X |

FOREIGN PATENT DOCUMENTS

| | | |
|---|---|---|
| 1768897 | 6/1958 | Fed. Rep. of Germany . |
| 974531 | 1/1961 | Fed. Rep. of Germany . |
| AU2718379 | 4/1979 | Fed. Rep. of Germany . |
| OS2952384 | 7/1980 | Fed. Rep. of Germany . |
| 2623161 | 4/1982 | Fed. Rep. of Germany . |

OTHER PUBLICATIONS

Werkstatt und Betrieb, 1966, p. 831.

*Primary Examiner*—Z. R. Bilinsky
*Attorney, Agent, or Firm*—Neuman, Williams, Anderson & Olson

[57] ABSTRACT

Method for producing threads and machine tool for thread milling, wherein in order to avoid high cutting speeds and also to produce short millings, a milling cutter is used, which comprises several teeth forming at least one thread, rotates at the point of engagement in the opposite direction to the workpiece, encompasses the latter during the production of an external thread with substantial radial play or in the production of an internal thread is encompassed by the workpiece with substantial radial play, and wherein the advance s of the milling cutter meets the following condition:

$$s = h \cdot (1 - i)$$

with h representing the pitch of the thread to be produced and i the rotational speed ratio of milling cutter and workpiece differing from 1.

11 Claims, 8 Drawing Figures

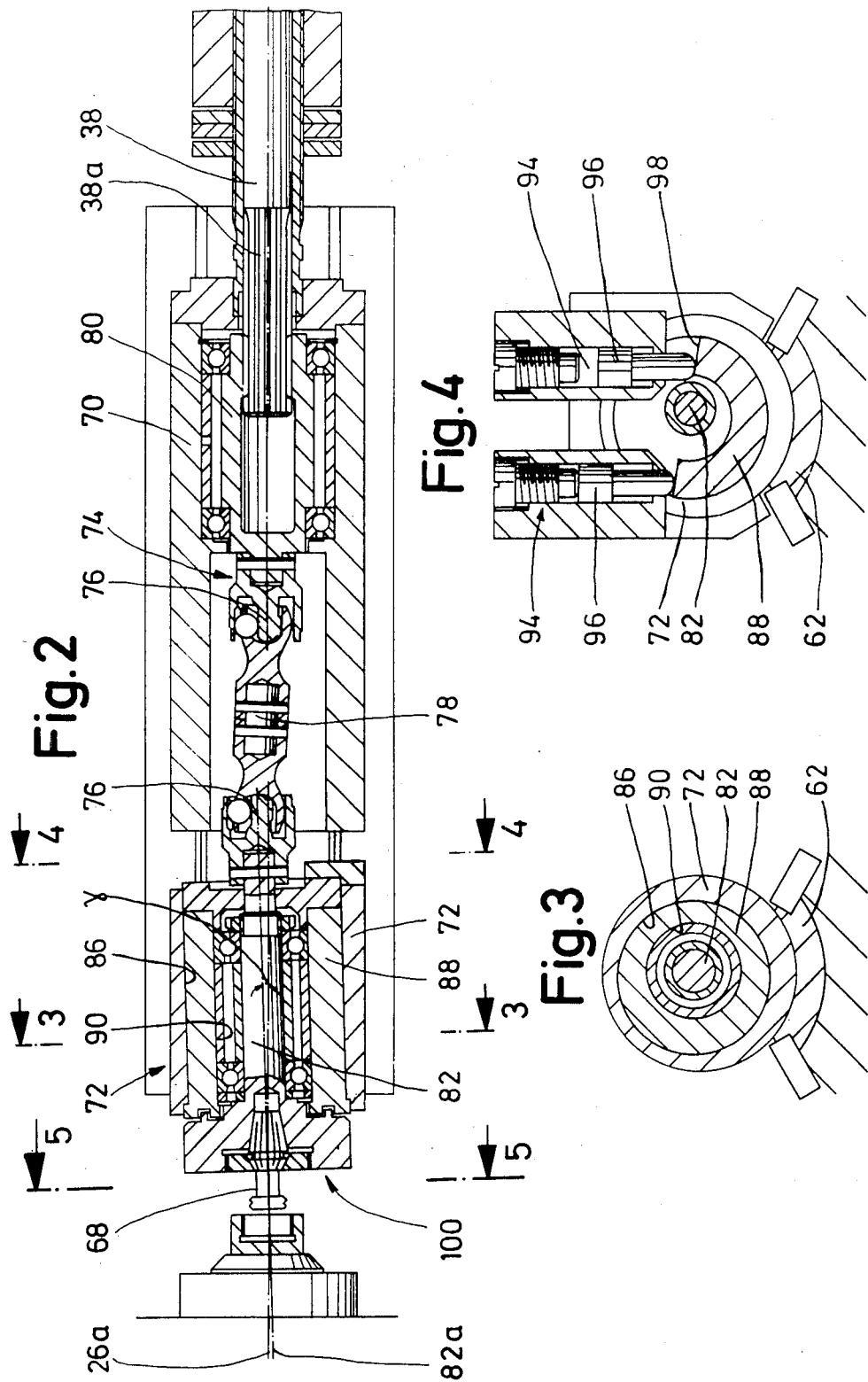

METHOD AND DEVICE FOR PRODUCING THREAD

The invention relates to a method for producing a thread on a rotating workpiece with the aid of a milling cutter, having a diameter which differs from the thread diameter, and comprising at its circumference several teeth whose profile corresponds with that of the thread to be produced, wherein the milling cutter is advanced along the thread to be produced and also rotated in the opposite direction to the workpiece about an axis which extends approximately parallel to the axis of rotation of the workpiece. The invention furthermore relates to a device for performing such a method. Internal threads with high true running precision have hitherto preferably been manufactured on automatic lathes by one of the following methods:

Thread Chasing:

Here, a tool is used which comprises only one single tooth-shaped cutting edge with a profile adapted to that of the thread to be produced, and which is advanced in accordance with the pitch of the thread in the direction of the workpiece spindle axis. The thread is produced in several runs, between which the tool is fed in a radial direction. This method produces a high quality thread, but it is time consuming since more that half of the work time is required for the radial and axial retraction and also for the radial feed of the tool. Satisfactory tool life is also not attainable since the entire cutting operation must be performed by a single tool cutting edge. Finally, in the manufacture of internal threads on workpieces consisting of a material with a tendency to form long chips, specific problems are caused by the tendency of the long chips to clog the thread bore, which may result in breakage of the tool. Use of a thread chaser comprising several teeth merely eliminates the disadvantage of the entire cutting operation having to be performed by a single cutting edge.

Thread Whirling:

In this case, an internal thread is milled with a thread milling cutter located inside the thread bore. In order to produce long threads, a disc-shaped milling cutter, drivable at optional rotational speed is used, and the workpiece is rotated in accordance with the pitch of the thread to be produced and guided past the milling cutter. The milling cutter penetrates immediately to the maximum thread depth, but forms short chips and attains better tool life on account of the workpiece being machined by several teeth. This production method does, however, require an extremely low rotational speed of the workpiece, which is not possible, for example, on multiple spindle automatic lathes since in the case of the latter, usually only one single, relatively high operating speed of the workpiece spindle is available (more particularly, also only in one direction of rotation).

Thread Milling:

For this purpose, a cylindrical thread milling cutter with several longitudinal grooves for producing short chips, whose length corresponds to that of the thread to be produced, is used. It penetrates into the workpiece immediately to the maximum thread depth, and there is no axial displacement between workpiece and milling cutter. Workpiece rotational speed and milling cutter rotational speed are equally high, but both rotate in opposite directions, with the result that the thread produced corresponds to that of the milling cutter, but with the opposite pitch direction. The statements made on thread whirling concerning the workpiece rotational speed apply to this method. On account of the thread being produced in the course of one single workpiece rotation, high stress is imposed on the milling cutter, and the thread produced exhibits a bevelled-type surface structure from which the number of teeth of the milling cutter is apparent.

Thread Chase Milling:

Finally, German Pat. No, 2,623,161 describes a multiple spindle automatic lathe with a thread chasing device using for the production of an internal thread a pitchless milling cutter, with which the thread, as is customary in chasing, is produced in several runs, with the feed of the tool, per workpiece rotation, again corresponding to the lead. With this method, too, the idle times referred to hereinabove in connection with the thread chasing must be tolerated. The known construction furthermore requires high expenditure since the milling shaft, its bearing and its drive components must perform the rapid chasing motions, which in view of the large displaced masses may only be effected with a relatively low chasing frequency, with the result that the machining times per unit are additionally increased. On the other hand, owing to its similarity to the thread chasing, this known method enables performance of the operation at the high workpiece rotational speed of the workpiece spindles of multiple spindle automatic lathes. Aside from the relatively long idle times, this known method does, however, have the disadvantage that the flanks of the thread produced with it exhibit a strong bevelled structure.

The object underlying the invention is to provide a thread producing method which is also suitable for the production of internal threads with high true running precision on multiple spindle automatic lathes and eliminates the disadvantages of the high structural expenditure and the long idle times in thread chasing.

Departing from a method of the kind described at the outset, this object is attained in accordance with the invention in that for the two members — workpieces and milling cutter— such different diameters are selected that one of the two members may be inserted into an opening in the other member with relatively large radial play, in that a milling cutter is used, whose teeth are arranged along at least one thread whose pitch is identical to that of the thread to be produced, but whose pitch direction differs from that of the thread to be produced, and in that the milling cutter is advanced per workpiece rotation along a path s which meets the condition $$s = h \cdot (1-i) \text{ with } i = n_F/n_S \neq 1$$

with h representing the pitch of the thread to be produced, i the rotational speed ratio of milling cutter and workpiece, $n_F$ the rotational speed of the milling cutter and $n_S$ the rotational speed of the workpiece.

Since with the method according to the invention only the condition that the rotational speed of the workpiece should not be identical to the rotational speed of the milling cutter, need be met, it is possible to work with the high workpiece spindle rotational speeds which are imperative for operations on a multiple spindle automatic lathe.

In the performance of the method according to the invention, the thread may be produced in one single run, i.e., the milling cutter travels only one single time over the thread area of the workpiece and is then retracted in a radial direction, i.e., disengaged from the workpiece and subsequently withdrawn in an axial direction. In order to produce threads of different diameter, but of the same pitch, on a workpiece, it is likewise only necessary to displace the milling cutter in a radial direction relative to the workpiece, whereas with conventional methods, thread taps, threading dies or the like of different diameter would have to be used. In the production of an internal thread, the workpiece encompasses the milling cutter penetrating the workpiece bore; the method according to the invention is, however, also suitable for the production of external threads, in which case, an annular or sleeve-type milling cutter is then used, which comprises the cutting teeth with grooves or gaps located therebetween on its internal circumference, and is guided over the workpiece, i.e., in contrast to the conventional thread milling, the milling cutter excompasses the workpiece. As will be apparent from the following, the profiles of the cutter teeth need not be exactly identical to the profile of the thread to be produced. When hereinabove and hereinafter reference is made to the fact that the milling cutter rotates in the opposite direction to the workpiece, what is meant is that workpiece and milling cutter at the point of engagement of the latter rotate past one another in opposite directions. Since with the method according to the invention, for example, also conical threads may be produced, the feed direction of the milling cutter need not extend parallel to the workpiece spindle axis; from the following it will be apparent that the milling cutter axis may also be inclined to the surface defined by the thread crests. Finally, it should be noted that contrary to operating with a thread tap in the production of an internal thread or with a threading die in the production of an external thread, with the method according to the invention, milling cutter and workpiece do not engage one another throughout the entire tool circumference, whereby the torque load of workpiece and tool is reduced, and, therefore, expansion of the workpiece and the tool and resulting inaccuracies are avoided.

Values of between approximately 0.8 and 1.2 (but with the exclusion of the value 1.0) for the rotational speed ratio i have proven satisfactory in practical application.

For the method according to the invention, a milling cutter is therefore used whose teeth define a thread with the same pitch as that of the thread to be produced, but with the pitch direction being a different one; for the production of a right-hand thread, the milling cutter therefore has a left-hand pitch and vice-versa. Owing to the different diameters of workpiece thread and milling cutter thread, the thread pitch angles are, however, in spite of the same thread pitches, different. The relatively large difference in diameter between milling cutter thread and workpiece thread to be produced is necessary in order to enable the tool to be radially retracted and released from the workpiece, however, this difference also leads to the advantage that long chips cannot form, and larger space is available for accommodation of the chips.

Finally, it should be noted that also the production of an external thread with a milling cutter which does not encompass the workpiece is also to be regarded as falling within the scope of the invention. In this case, however, a certain bevelled or polygon structure of the thread cannot be completely avoided since the tool does not rest so snugly against the workpiece as in the case of use of an annular or sleeve-type milling cutter.

In order that the first tooth of the milling cutter engaging a workpiece area need not cut out the thread in its entire depth, use of a milling cutter is recommended wherein the radial height of the teeth increases in the direction opposite to the direction of rotation of the milling cutter, i.e., the cutter tooth first engaging the respective workpiece area has a lower radial height than corresponds to the depth of the thread to be produced. The following cutter tooth is somewhat higher and so on. The same principle could be applied to the width of the cutter teeth.

The milling cutter axis could extend parallel to the axis of rotation of the workpiece. In a preferred embodiment of the method according to the invention, however, the milling cutter is rotated about an axis which forms with the axis of the thread to be produced an angle which is equal to the sum of the pitch angles of workpiece thread and milling cutter thread. In this way, the cutter teeth are made to rest exactly against the flanks of the workpiece threads.

While in thread chasing high feed speeds of the tool are necessary in order not to further increase the machining times of the units, relatively slow feed speeds may be worked with in the method according to the invention. Since the mass forces are consequently a lot smaller than in thread chasing, predetermined thread lengths may be maintained much more precisely so that it is, for example, possible to cut threads right up to a shoulder or a bottom. Finally, with the aid of a rule, a copying control or a numerical control, radial motions of the milling cutter may be controlled in such a way that conical threads and/or several threads of different diameter may be produced in one run, which is partly not possible in thread chasing or thread chase milling.

Suitable for performing the method according to the invention is a device with a drivable workpiece spindle comprising a workpiece clamping fixture, a tool spindle comprising a milling cutter clamping fixture, with workpiece spindle and tool spindle extending approximately parallel to each other and being displaceable relative to each other in the direction of the workpiece spindle by at least one feed drive, and also with a milling cutter which comprises several teeth on its circumference and whose diameter differs from that of the thread to be produced. Such a device is designed in accordance with the invention in such a way that one of the two members—workpiece and milling cutter—comprises an opening whose diameter is substantially larger than the external diameter of the other member, and that the cutter teeth are arranged along at least one thread whose pitch is identical to that of the thread to be produced, but whose pitch direction differs from that of the thread to be produced. In this case, it is recommended to provide an undercut on the cutter teeth, i.e., so that the radial height of each cutter tooth decreases in the direction opposite to the direction of rotation of the milling cutter.

The following Table contains the rotational speed of the milling cutter in dependence upon the rotational speed of the workpiece and also the feed direction of the milling cutter relative to the workpiece for all possible threads, with the references to the direction of rotation of workpiece and milling cutter being based on the DIN standard (according to which the direction of rotation of an object held by a spindle is defined by that direction of rotation exhibited by the object when the front spindle end is viewed; according to this definition, workpiece and milling cutter therefore rotate in the same direction when they rotate in opposite directions as viewed transversely to the workpiece spindle and to the milling cutter spindle). Finally, "milling cutter feed direction from the spindle" means that the milling cutter moves away from the workpiece spindle, while "to the spindle" means that the milling cutter approaches the workpiece spindle. Furthermore, in the following Table, $n_F$ indicates the rotational speed of the milling cutter and $n_S$ the rotational speed of the workpiece.

|  | Right-Hand Thread (Milling Cutter Pitch Left) | | Left-Hand Thread (Milling Cutter Pitch Right) | |
| --- | --- | --- | --- | --- |
|  | External Thread | Internal Thread | External Thread | Internal Thread |
| Direction of Rotation (Workpiece and Milling Cutter) Right Milling Cutter Feed Direction | | | | |
| to the spindle | $nF > nS$ | $nF < nS$ | $nF < nS$ | $nF > nS$ |
| from the spindle | $nF < nS$ | $nF > nS$ | $nF > nS$ | $nF < nS$ |
| Direction of Rotation (Workpiece and Milling Cutter) Left Milling Cutter Feed Direction | | | | |
| to the spindle | $nF < nS$ | $nF > nS$ | $nF > nS$ | $nF < nS$ |
| from the spindle | $nF > nS$ | $nF < nS$ | $nF < nS$ | $nF > nS$ |

Further features, advantages and details of the invention are apparent from the appended claims and/or the following description and also from the attached illustration of two preferred embodiments of the device according to the invention, in which:

FIG. 2 is a horizontal section taken along line 2—2 in FIG. 1 on an enlarged scale;

Figure 6:
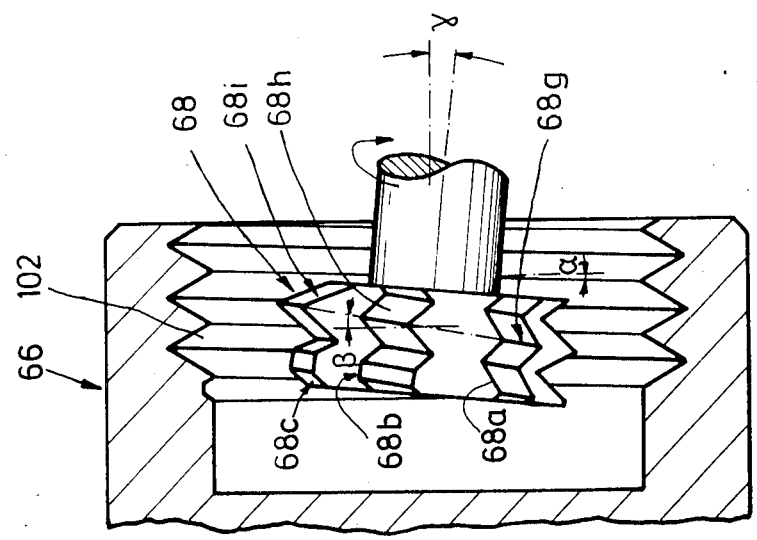
Figure 5:
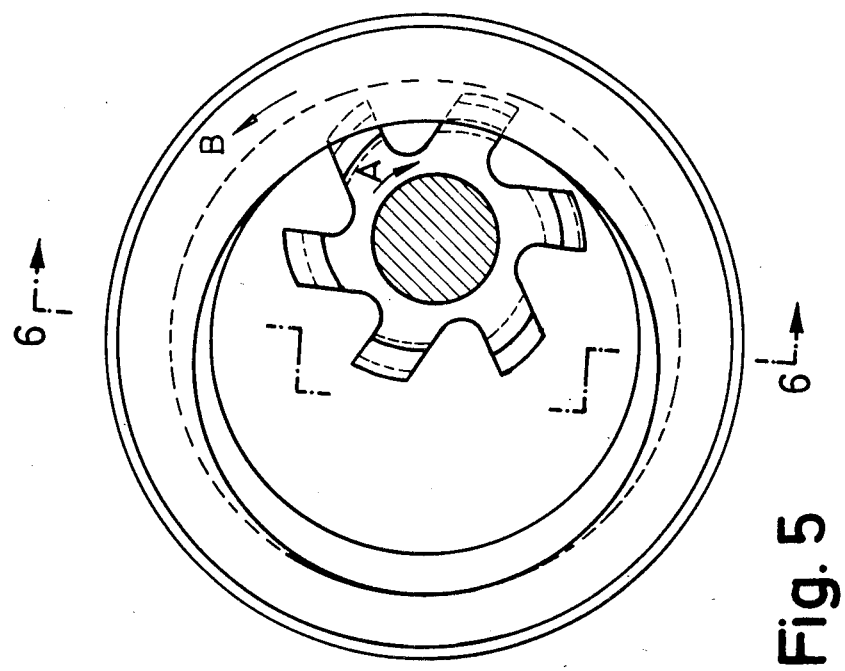

FIGS. 3 and 4 are two sections taken along the lines 3—3 and 4—4 in FIG. 2, but turned through 90° in each case;

FIG. 5 is a section taken along line 5—5 in FIG. 2, but with the milling cutter engaging the workpiece;

FIG. 6 is a section taken along line 6—6 in FIG. 5; and

Figure 8:
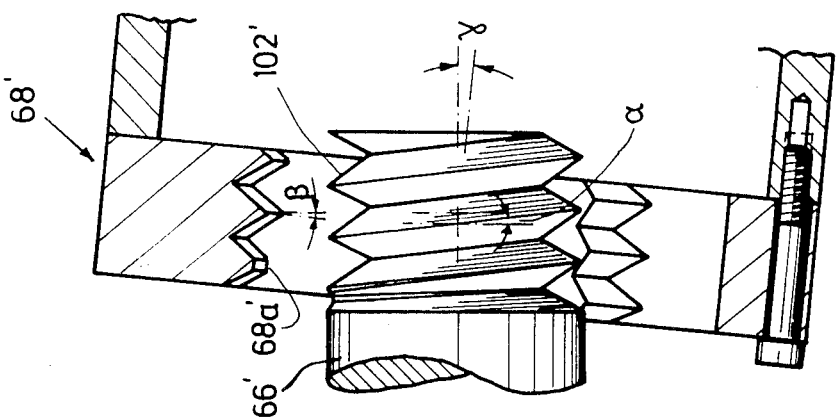
Figure 7:
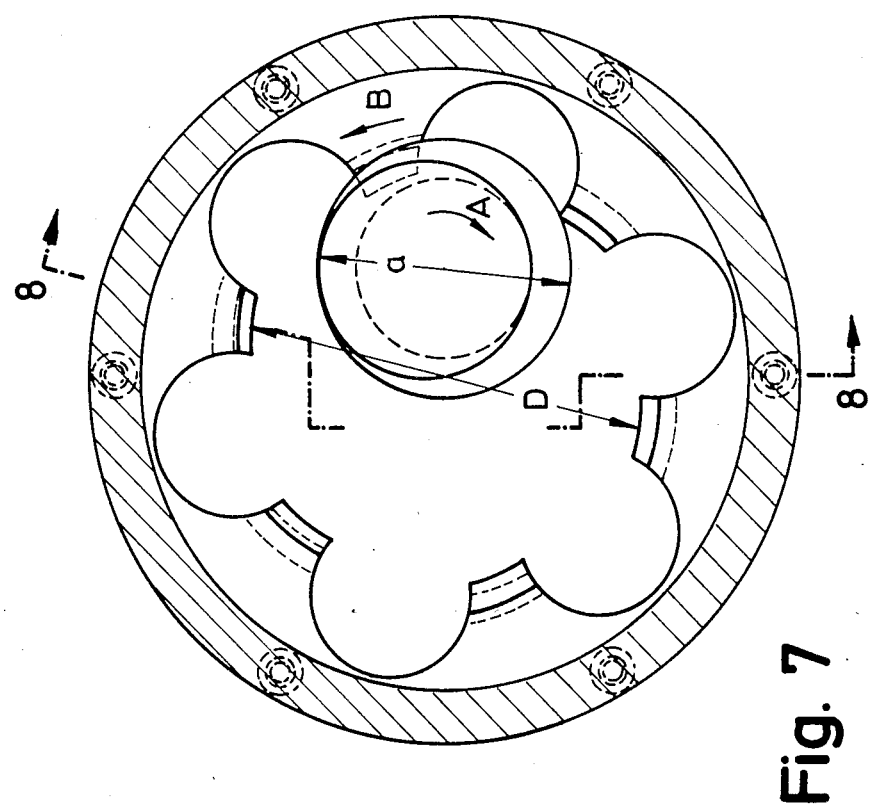

FIGS. 7 and 8 are illustrations corresponding to FIGS. 5 and 6 of a second embodiment for producing an external thread.

Figure 1:
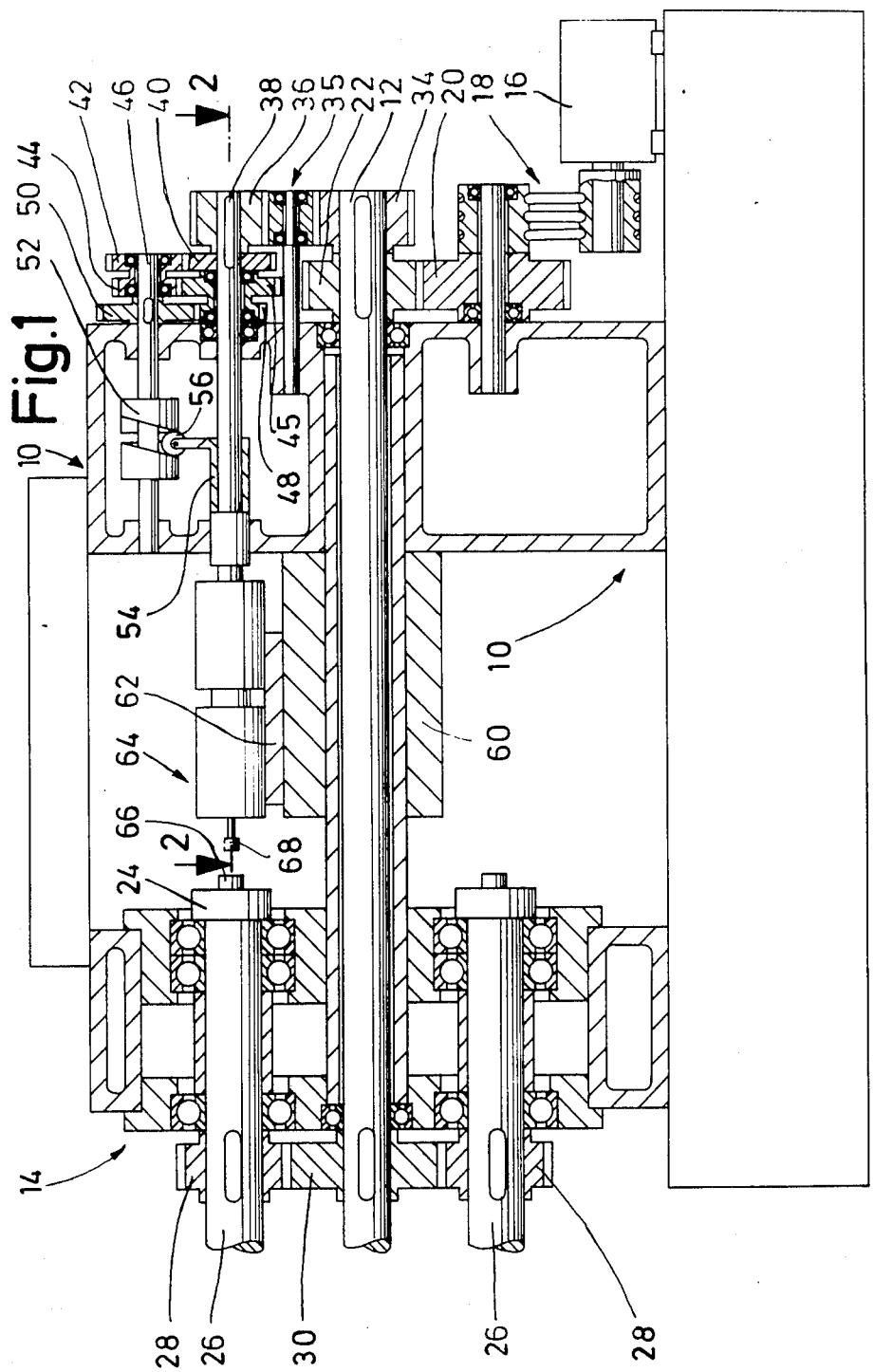
FIG. 1 is an axial vertical section taken through the area of a multiple spindle automatic lathe affected by the invention.

FIG. 1 shows a section of a machine frame 10, in which a central drive shaft 12 and a spindle drum 14 rotatable about the axis of the latter are mounted. Installed on the machine frame 10 is a drive motor 16, which drives a toothed gear 22 attached to the drive shaft 12 via a belt drive 18 and a toothed gear 20 driven by the latter. Mounted for rotation in the drum 14 are several workpiece spindles 26, equipped with chucks 24, with each carrying a toothed gear 28 which is rigidly connected to it and meshes with a toothed gear 30 attached to the drive shaft 12, so that all of the workpiece spindles are always driven in the same direction and at the same rotational speed.

Attached to the right end of the central drive shaft 12, as shown in FIG. 1, is an output toothed gear 34, which drives via an intermediate gear 35 a toothed gear 36, which is attached to a tool drive shaft 38, which is mounted in a rotatable, but axially immovable manner in the machine frame 10. A further toothed gear 40 attached to the tool drive shaft 38 meshes with an intermediate gear 42 which, like an adjacent intermediate gear 44, rigidly connected to it, is rotatably mounted on a camshaft 46 which is mounted in a rotatable, but axially immovable manner in the machine frame 10. The intermediate gear 44 meshes with an intermediate gear 46 which is rotatably mounted on the tool drive shaft 38 and is rigidly connected to an adjacent intermediate gear 48. The latter meshes with a driving gear 50 of the camshaft 46 rigidly connected to it. Attached to the latter is a feed cam 52 which a scanner 56 attached to a feed sleeve 54 engages. The feed sleeve is mounted for displacement in the machine frame 10 and on the tool drive shaft 38—in the longitudinal direction of the latter.

On a guide 60 belonging to the machine frame 10, a carriage 62 is displaceably guided parallel to the axes of the workpiece spindles 26. It carries a thread milling device designated in its entirety by 64 which will be explained in greater detail with reference to FIGS. 2 to 4. FIG. 1 also show a milling cutter 68 of this thread milling device and a workpiece 66 in which an internal thread is to be produced with the aid of this milling cutter.

As is apparent from FIG. 2, the left end of the tool drive shaft 38 is in the form of a multiple splined shaft section 38a. The axis 38b of the tool drive shaft is in alignment with the axis 26a of that workpiece spindle which is located in front of the thread milling device 64. It is evident from FIGS. 3 and 4 that the carriage 62 is of dish-shaped configuration; it carries a rear housing 70 and also a front housing 72 of the thread milling device 64, with a universal joint shaft designated in its entirety by 74 extending between these. The latter includes two homokinetic synchronous joints 76 via which and an intermediate section 78, a shaft body 80 rotatably mounted in the rear housing 70 is in drive connection with a milling shaft 82 disposed in the front housing 72. The multiple splined shaft section 38a enables together with a corresponding toothing in the interior of the shaft body 80, in the form of a hollow body, the latter to be driven, and yet to be displaced in the longitudinal direction of the tool drive shaft 38.

A bearing sleeve 88 is rotatably mounted in a bore 86 of the front housing 72, whose axis extends parallel to the axis 82a of the milling shaft 82, forms an angle γ with the axis 26a of the workpiece spindle 26 located in front of the milling cutter 68 and cuts the axis 26a, in accordance with the invention, in the center of the milling cutter 68 (vide FIG. 2). It comprises a bore 90 which is eccentric in relation to the inclined bore 86 and in which the milling shaft 82 is rotatably mounted so that the latter may, by turning of the bearing sleeve 88, be radially advanced or retracted with respect to the axis of the upper workpiece spindle 26. The way in which the milling cutter is driven via a universal joint shaft and also the simple manner in which the milling shaft is obliquely mounted and also held for advance and retraction in a radial direction constitute special features of the thread milling device according to the invention. The same applies to its displacement via a carriage 62 carrying it and a feed control engaging the thread milling device 64.

As FIG. 4 shows, two hydraulic cylinders 94 disposed in the front housing 72 serve with their pistons 96 to turn the bearing sleeve 88; for this purpose, the latter comprises at its rear end a cut which results in the formation of two engagement surfaces 98 for the pistons 96.

Finally, it should be noted that the milling shaft 82 is provided at its front end with a clamping fixture 100 to enable a milling cutter 68 to be exchangeably attached to the milling shaft.

FIGS. 5 and 6 show the workpiece 66 after completion of an internal thread 102, but with the milling cutter 68 illustrated in such a way that it is still in engagement with the workpiece, i.e., resting snugly against the flanks of the internal thread. In FIG. 5, the rotational drive directions of the milling cutter 68 and the workpiece 66 are indicated by arrows A and B. The internal thread 102 is illustrated as a right-hand thread with a pitch h and a pitch angle $\alpha$, consequently, teeth 68a, 68b, 68c ... 68g, 68h, 68i ... of the milling cutter 68 successively engaging the workpiece form a left-hand thread of the same pitch h as the internal thread 102. On account of the smaller diameter of the milling cutter 68, the cutter teeth do, however, form a thread with a larger pitch angle $\beta$, so that the inclination of the axis of the milling cutter 68 with respect to the axis of the internal thread 102 and, therefore, with respect to the workpiece spindle axis 26a, i.e., the angle $\gamma$, has the value $(\alpha + \beta)$. From FIG. 5, the undercut of the teeth of the milling cutter 68 is apparent; FIG. 6 illustrates the fact that the radial height of the first cutter tooth 68a engaging the workpiece is less than that of the second cutter tooth 68b etc., i.e., the radial height of the successively engaging cutter teeth increases in the direction opposite to the direction of rotation of the milling cutter, at least throughout the first two or three cutter teeth engaging the workpiece. If, in the embodiment illustrated, the milling cutter 68 rotates quicker than the workpiece 66, the direction of advance of the milling cutter is oriented to the left. In this connection, reference is also made to the Table given hereinabove.

FIGS. 7 and 8 show clearly how the invention enables an external thread 102' to be made in an analogous manner on a workpiece 66'. For this purpose, an annular or sleeve-shaped milling cutter 68' is used, whose teeth 68a' etc., again define a longitudinal thread, if the external thread 102' is a right-hand thread, and also define an internal diameter D which is substantially larger than the external diameter d of the external thread 102'.

Appropriate design of the feed cam 52 for advancement of the milling cutter also enables, for example, an internal thread located deeper in a workpiece to be reached quickly with the milling cutter in rapid motion. Similarly, thread interruptions such as grooves (so-called recesses) may be quickly passed over in rapid motion without the milling cutter leaving the pitch path of the thread to be produced.

What is claimed is:

1. A method for forming a thread on a workpiece while rotating about an axis of such workpiece thread to be formed, by a milling cutter having several cutting teeth which are arranged along at least one thread; the latter thread having a pitch identical to that of the workpiece thread, and a thread direction opposite to that of the workpiece thread; said cutting teeth having a profile corresponding with the profile of the workpiece thread and defining a diameter which differs from the diameter of the workpiece thread; said workpiece and said cutter comprising two members one of which has an opening for reception of the second member; said method comprising the steps of:

(a) rotating the milling cutter and workpiece; said milling cutter being rotated in a direction of rotation opposite to the direction of rotation of the workpiece, about a tool axis which extends approximately parallel to the axis of the workpiece thread;
    (b) inserting said second member into the opening of said one member,
    (c) advancing one of said two members relative to the other along a feed path parallel to the axis of the workpiece thread and along the entire length of the workpiece thread while maintaining said milling cutter in contact with the workpiece in such manner that said cutting teeth mill the workpiece thread to its entire depth in a single run along the length of the workpiece thread; the advancement s per rotation of the workpiece being in accordance with the equation:

$$s = h \cdot (1 - I) \text{ with } i = n_F/n_S \neq 1$$

wherein h is the pitch of the workpiece thread and i is the rotational speed ratio of cutter and workpiece; $n_F$ being the rotational speed of the cutter and $n_S$ being the rotational speed of the workpiece.

2. The method of claim 1 in which said rotational speed ratio i is between approximately 0.8 and 1.2.

3. The method of claim 1 in which the milling cutter is rotated about an axis which forms with the axis of the workpiece thread an angle which is equal to the sum of the pitch angles of the workpiece thread and of the thread comprising the teeth of the cutter.

4. The method of claim 1 in which the workpiece and cutter rotation meet one of the conditions given in the subjoined Table:

|  | Right-Hand Thread (Milling Cutter Pitch Left) | | Left-Hand Thread (Milling Cutter Pitch Right) | |
| --- | --- | --- | --- | --- |
|  | External Thread | Internal Thread | External Thread | Internal Thread |
| Direction of Rotation (Workpiece and Milling Cutter) Right | | | | |
| Milling Cutter Feed Direction | | | | |
| to the spindle | nF > nS | nF < nS | nF < nS | nF > nS |
| from the spindle | nF < nS | nF > nS | nF > nS | nF < nS |

-continued

| | Right-Hand Thread (Milling Cutter Pitch Left) | | Left-Hand Thread (Milling Cutter Pitch Right) | |
|---|---|---|---|---|
| | External Thread | Internal Thread | External Thread | Internal Thread |
| Direction of Rotation (Workpiece and Milling Cutter) Left | | | | |
| Milling Cutter Feed Direction | | | | |
| to the spindle | nF < nS | nF > nS | nF > nS | nF < nS |
| from the spindle | nF > nS | nF < nS | nF < nS | nF > nS |

5. Apparatus for forming a thread on a workpiece by means of a milling cutter, comprising a workpiece spindle for supportably mounting a workpiece; a milling cutter having cutting teeth; a tool spindle supportably mounting said milling cutter; bearing means for supporting said workpiece spindle for rotary movement about a workpiece spindle axis, for supporting said tool spindle for rotary movement about a tool spindle axis, and for displacement of said spindles relative to each other; means for rotating said workpiece spindle and said tool spindle in opposite directions of rotation; means on said workpiece spindle and on said tool spindle for retaining the workpiece and said milling cutter to said workpiece spindle and said tool spindle respectively; the workpiece and said milling cutter comprising members one of which has an opening for reception of the other member whereby cutting teeth of the milling cutter may engage a surface of the workpiece; said milling cutter having a plurality of cutting teeth arranged along at least one thread having a pitch identical to that of the workpiece thread and a thread direction opposite to that of the workpiece thread; said cutting teeth having a profile corresponding with the profile of the workpiece thread and defining a diameter which differs from the diameter of the workpiece thread; and feed means for advancing one of said members with the spindle on which mounted relative to the other member by an advancement s per rotation of the workpiece and along a feed path parallel to the axis of the workpiece thread; said feed path being so located relative to said other member that as the cutter is moved along the entire length of the workpiece thread at least one of said cutting teeth extends into the workpiece of the entire depth of its thread, said advancement s meeting the condition $$s = h \cdot (1 - i) \text{ with } i = n_F/n_S \neq 1$$

with h representing the pitch of the workpiece thread, i the rotational speed ratio of cutter and workpiece, $n_F$ the rotational speed of the cutter and $n_S$ the rotational speed of the workpiece.

6. The apparatus of claim 5 in which the maximum radial height of the cutter teeth increases in the direction opposite to the direction of rotation of the cutter.

7. The apparatus of claim 5 in which the radial height of each cutter tooth decreases in the direction opposite to the direction of rotation of the cutter.

8. The apparatus of claim 5 in which the tool spindle axis forms with the workpiece spindle axis an angle which is equal to the sum of the pitch angles of the workpiece thread and of the thread of the cutter.

9. The apparatus of claim 5 in which the teeth of the cutter are arranged along several threads.

10. The apparatus of claim 5 in which the one member having an opening comprises a sleeve-shaped milling cutter having cutting teeth arranged about an inner peripheral surface portion thereof for engaging a workpiece comprising the other member on which male threads are formed.

11. The apparatus of claim 5 in which the other member comprises a milling cutter having cutting teeth arranged about the outer periphery thereof for engaging the inner peripheral surface of a cylindrical workpiece comprising said one member in which received for forming female threads thereon.

* * * * *